(12) United States Patent
Nomoto et al.

(10) Patent No.: US 7,092,775 B2
(45) Date of Patent: Aug. 15, 2006

(54) PRODUCTION PLANNING APPARATUS AND PRODUCTION PLANNING METHOD

(75) Inventors: Tazu Nomoto, Yokohama (JP);
Mitsuhiro Enomoto, Kamakura (JP);
Masayuki Toda, Yokohama (JP);
Mitsunobu Nakamura, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/099,626

(22) Filed: Apr. 6, 2005

(65) Prior Publication Data

US 2005/0228521 A1    Oct. 13, 2005

(30) Foreign Application Priority Data

Apr. 8, 2004    (JP)    ............... 2004-113730

(51) Int. Cl.
*G06F 19/00*    (2006.01)

(52) U.S. Cl. .................. 700/97; 700/100; 700/102

(58) Field of Classification Search ............. 700/95, 700/97, 99, 100, 101, 102, 103, 22, 28, 29; 705/7, 8, 9, 27
See application file for complete search history.

(56) References Cited

U.S. PATENT DOCUMENTS

| | | | |
|---|---|---|---|
| 5,819,232 A * | 10/1998 | Shipman ..................... | 705/8 |
| 6,606,527 B1 * | 8/2003 | de Andrade et al. ......... | 700/97 |
| 6,684,117 B1 * | 1/2004 | Bacin et al. ................. | 700/98 |
| 2002/0120533 A1 * | 8/2002 | Wiesenmaier ............... | 705/27 |
| 2004/0148206 A1 * | 7/2004 | Matsumoto et al. .......... | 705/6 |
| 2005/0015167 A1 * | 1/2005 | Searcy et al. ............... | 700/100 |

FOREIGN PATENT DOCUMENTS

| | | |
|---|---|---|
| JP | 2000-353190 | 12/2000 |
| JP | 2001-034321 | 2/2001 |

\* cited by examiner

*Primary Examiner*—Leo Picard
*Assistant Examiner*—Charles Kasenge
(74) *Attorney, Agent, or Firm*—Antonelli, Terry, Stout and Kraus, LLP.

(57) ABSTRACT

The invention proposes a method for devising a production plan of a product to be produced through multiple production steps having different characteristics in a supply chain across multiple companies and/or multiple factories. The method divides a production step of the product into multiple production steps in advance based on a constraint to be considered when the production plan therefor is devised, defines identifiers for the multiple production steps, prestores the defined identifiers in a storage portion as step identification information, and prestores step information having at least correspondences between the production steps and items. In this case, a calculation processing portion identifies and determines production steps and order of calculations, which are involved in the production of the product, based on the shipping plan information, parts table and step information stored in the storage portion, determines which of first and second production plan calculation algorithms is to be executed based on the order of calculations and based on the step identification information stored for each production step, and calculates the production plan by using the determined algorithm.

4 Claims, 6 Drawing Sheets

FIG. 1

□ STORAGE PORTION FOR STORING INPUT INFORMATION
◯ PROCESSING PORTION FOR CALCULATING AND OUTPUTTING RESULT
▭ STORAGE PORTION FOR STORING CALCULATION RESULT

| PARENTS | CHILDREN | NUMBERS OF COMPONENTS | LEAD TIMES |
|---|---|---|---|
| P01 | i11 | 1 | 1 |
| P01 | B11 | 1 | 1 |
| P02 | i21 | 1 | 1 |
| P02 | B11 | 1 | 1 |
| i11 | B12 | 1 | 1 |
| i21 | B22 | 1 | 1 |
| B12 | M13 | 1 | 1 |
| B22 | M23 | 1 | 1 |

FIG. 4

| ITEMS | STEPS | SHARES |
|---|---|---|
| P01 | PRODUCT ASSEMBLY | 20 |
| P02 | PRODUCT ASSEMBLY | 20 |
| i11 | CROSS ASSEMBLY | 20 |
| i21 | CROSS ASSEMBLY | 20 |
| B11 | PARTS MANUFACTURING | 20 |
| B12 | PARTS MANUFACTURING | 20 |
| B22 | PARTS MANUFACTURING | 20 |

| STEPS | CAPACITIES |
|---|---|
| PRODUCT ASSEMBLY | 2000 |
| CROSS ASSEMBLY | 2000 |
| PARTS MANUFACTURING | 2000 |

FIG. 5

| ITEMS BEFORE CHANGE | ITEMS AFTER CHANGE | STEPS | SHARES OF PRODUCTION |
|---|---|---|---|
| B11 | B12 | PARTS MANUFACTURING | 1000 |
| B11 | B22 | PARTS MANUFACTURING | 1000 |
| B12 | B11 | PARTS MANUFACTURING | 2000 |
| B12 | B22 | PARTS MANUFACTURING | 1000 |
| B22 | B11 | PARTS MANUFACTURING | 1000 |
| B22 | B12 | PARTS MANUFACTURING | 1000 |

FIG. 6

| STEPS | CAPACITIES |
|---|---|
| PRODUCT ASSEMBLY | 0 |
| CROSS ASSEMBLY | 0 |
| PARTS MANUFACTURING | 1 |

PRODUCTION PLANS

| ITEMS TO PRODUCE | PRODUCTION STEPS | AMOUNTS TO PRODUCE | DATES TO START | DATES TO COMPLETE |
|---|---|---|---|---|
| P01 | PRODUCT ASSEMBLY | 50 | 04/29/2004 | 04/30/2004 |
| P02 | PRODUCT ASSEMBLY | 50 | 04/29/2004 | 04/30/2004 |
| i11 | CROSS ASSEMBLY | 50 | 04/28/2004 | 04/29/2004 |
| i21 | CROSS ASSEMBLY | 50 | 04/28/2004 | 04/29/2004 |
| B11 | PARTS MANUFACTURING | 50 | 04/28/2004 | 04/29/2004 |
| B22 | PARTS MANUFACTURING | 50 | 04/27/2004 | 04/28/2004 |
| B12 | PARTS MANUFACTURING | 50 | 04/26/2004 | 04/27/2004 |

PROCUREMENT PLANS

| ITEMS TO PRODUCE | AMOUNTS TO PRODUCE | DATES TO PROCURE |
|---|---|---|
| M13 | 50 | 04/26/2004 |
| M23 | 50 | 04/27/2004 |
|  |  |  |
|  |  |  |
|  |  |  |
|  |  |  |

PRODUCTION PLANNING APPARATUS AND PRODUCTION PLANNING METHOD

BACKGROUND OF THE INVENTION

1. Field of the Invention

The present invention relates to a production planning apparatus and method for an industrial product and in particular to a production planning apparatus and method for a product to be produced through multiple steps in different production forms.

2. Description of the Related Art

Many companies in manufacture industries may perform a task called "Available to Promise" of, to a request from a sales department or a product dealer, that is, a request for "how many of which product by when", checking whether the product can be manufactured and delivered as requested or not and answering "how many (amount) of which product are available by when (delivery time)". The product subject to the Available to Promise, the delivery time and amount are informed to a production factory of the product of a manufacture company, and the production factory produces and ships the product so as to keep the delivery time and amount. A company not performing Available to Promise produces and ships a product in response to and accordance with a request from a sales department or dealer thereof.

In order to perform Available to Promise, attentions must be paid to following points. First of all, since the market competition is heating up in recent years, an order might highly possibly go to a different company when the Available to Promise takes time. Also, when a product could not be supplied by the promised delivery time, the reliability may be lowered, and subsequent orders may go to other companies.

Many technologies have been proposed for calculating the delivery time in consideration of production constraints by using a production planning apparatus in order to avoid these risks and perform secure Available to Promise. JP-A-2000-353190, for example, discloses an example thereof.

Though various production planning algorithms have been proposed which are executed in a planning portion of a production planning apparatus, all of the conventional technologies use a single algorithm to plan all production steps. JP-A-2001-34321 discloses a production planning apparatus as a technology in consideration of differences among multiple production steps included in production steps of a product. The production planning apparatus proposes an algorithm allowing the load leveling in packets in both of production assembly step and source step, which is a bottleneck, but adopts a common algorithm in the both steps.

Banbara et al, "Java Niyoru Isyu Kyocho Seiyaku Kaisyo System No Kaihatsu (Development of Heterogeneous Constraint Solving System)", Information-technology Promotion Agency, FY2002, Project Reports Rev. 2 introduces a technology relating to use of multiple algorithms. The technology does not embody the production planning algorithm but is implemented for obtaining a larger advantage than that of tuning of a single algorithm by operating multiple heterogeneous constraint solvers (algorithms) cooperatively and competitively in parallel. The cooperative constraint solving system disclosed in the document includes different kinds of solvers and a scheduler portion for managing the solvers, and the scheduler portion causes the constraints solvers to cooperate/compete to manage so as to obtain a solution efficiently.

In order to produce one product, many companies distribute tasks to multiple sections including a section for processing parts and a section for producing a product by assembling processed parts. In order to supply a product quickly in accordance with a change in demand, such companies mainly have a supply chain among the sections so that items and information can be synchronized among the sections to produce the product. The supply chain was once provided among sections in one company but, in recent years, tends to be provided among multiple companies. For example, a company that manufactures/sells personal computers only informed an amount of supply based on the production plan of a factory of the company to a company that manufactures parts of personal computers, which are in an upstream task, (which will be called supplier, hereinafter). However, in recent year, the company that manufactures/sells personal computers increasingly devises a production plan for the personal computers by checking even the capacity of supply of the factory of the supplier. The production planning by checking even the capacity of supply of the supplier is made for minimizing the risk that a promised amount of supply is not supplied from the supplier and/or the risk due to the excessive parts inventory for securely producing and supplying products to the market, which were problems not addressed before.

A production plan must be devised or changed quickly in order to control the supply of products quickly in accordance with a change in demand. As one device for implementing the control, an information system may be adopted which devises production plans for factories of all sections sharing the tasks for producing products.

However, the production forms to be implemented by the factories do not always agree. The production forms may be divided into those of the process type and those of the assembly type, which have different constraint conditions on which the precision of the production plan depends. The assembly type has many parts to assemble, and whether required parts can be procured or not is an important issue for the production plan. An assembly task can be performed at a constant number of man-hours as far as required parts are available. On the other hand, since the process type has constraints of efficiency and/or yield of production tasks due to changes of the types of manufacture apparatus, the order of tasks is an important issue for the production plan. The above-described example relating to personal computers has a hard disk and memory module requiring the process type production step relating to semiconductor in the parts processing in the upstream of the production while requiring the assembly type manufacture step of assembling parts in the downstream step. Generally, many steps in upper streams of production may have process type production forms.

Material Requirements Planning (MRP) calculation method is an algorithm superior in production planning having parts as a constraint like the assembly type. MRP is a method for calculating a required amount of parts to order by exploding the product to be produced into parts, calculating a total amount of the parts required for the production and subtracting the inventory and stock on order therefrom. In other words, MRP calculation calculates a plan for procuring or manufacturing "a required amount (required amount) of required item (item) by a required time (delivery time)" for an item such as a part and a raw material based on a devised production level shipping plan thereof. MRP calculation does not calculate an order of tasks since the task times in steps are regarded as fixed values therein. For example, in order to produce products A and B by March 31, the result that the products A and B are to be charged on March 30 and the production will be completed on March 31 can be calculated if one day is required for producing the products. However, MRP calculation does not calculate which of the products A and B must be produced first.

On the other hand, a scheduling calculation method is an algorithm superior in production planning having an order of tasks as a constraint like the process type. Scheduling is a method for obtaining an order of tasks (in which order products must be produced) by handling the step operation times and product delivery time as constraints when multiple products must be produced in a step. In the production especially in multiple steps, the inter-step inventory of parts required for the production is not considered even if any.

Since algorithms suitable for devising a production plan depend on characteristics of steps in this way, a production planning apparatus adopting a single algorithm as described above cannot devise a production plan involving both assembly type and process type steps in consideration of constraint conditions of both of them simultaneously. If MRP is applied to the process type, the order of tasks cannot be considered. On the other hand, if the scheduling calculation method is applied to the assembly type, the inventory of parts and stock on order cannot be considered. A single algorithm may be developed which include both functions of MRP and scheduling and can devise a production plan in consideration of orders of assembly type and process type tasks and inventories. However, the calculation is excessive in quality and disadvantageously increases the calculation time.

SUMMARY OF THE INVENTION

The invention was made in view of these points, and it is an object of the invention to allow devising a production plan, which is information required for accurately and quickly answering the delivery time of a product to be produced through multiple steps having different characteristics.

More specifically, it is an object of the invention to devise a production plan in consideration of the inter-base and/or inter-step inventories and in-process items and inter-task setups.

Banbara et al, "Java Niyoru Isyu Kyocho Seiyaku Kaisyo System No Kaihatsu (Development of Heterogeneous Constraint Solving System)", Information-technology Promotion Agency, FY2002, Project Reports Rev. 2 discloses a technology in which multiple heterogeneous constraint solvers are effectively used in cooperative and competitive parallel operations with reference to the approximate optimum solution search and SAT planning examples using developed three kinds of probability constraint solvers. Banbara et al. further proposes a method in which solutions are obtained by candidate solvers and the best solution is selected therefrom when no reference is provided for selecting one of heterogeneous solvers. However, when the method is applied to production planning subject to the invention, a higher performance computer than a general computer is required for activating multiple solvers simultaneously since a production planning algorithm is large. Accordingly, it is a specific object of the invention to provide a product planning apparatus and method using multiple product planning algorithms in view of the problems inherent to production planning.

It is another object of the invention to provide, for a product production planning across multiple companies or multiple bases, a production planning apparatus and method for devising production plans for the companies and/or production bases independent of each other.

In order to solve the problems, in devising a production plan based on at least shipping plan information and parts table of a product, the invention divides a production step of the product into multiple production steps in advance based on a constraint to be considered when the production plan therefor is devised, defines identifiers for the multiple production steps and prestores the defined identifiers in a storage portion as step identification information, and prestores step information having at least correspondences between the production steps and items in the storage portion. In this case, a calculation processing portion identifies and determines production steps and order of calculations, which are involved in the production of the product, based on the shipping plan information, parts table and step information stored in the storage portion, determines which of first and second production plan calculation algorithms is to be executed based on the order of calculations and based on the step identification information stored for each production step, and calculates the production plan by using the determined algorithm.

The invention may prestore, in the storage portion, setup time information indicating the setup time for each work schedule in each production step. The calculation processing portion may determine which of first and second production plan calculation algorithms is to be executed based on the setup time information and calculate the production plan by using the determined algorithm.

According to the invention, a scheduling calculation may be applied to a step having an order constraint for a product production plan having a manufacturing step with a throughput depending on the order of start so that quick Available to Promise based on the accurate production plan can be achieved, which could not be achieved by conventional MRP.

DESCRIPTION OF THE PREFERRED EMBODIMENT

An embodiment of the invention will be described below with reference to drawings.

First of all, a production flow of a product according to this embodiment will be described with reference to FIG. 2.

Figure 2:
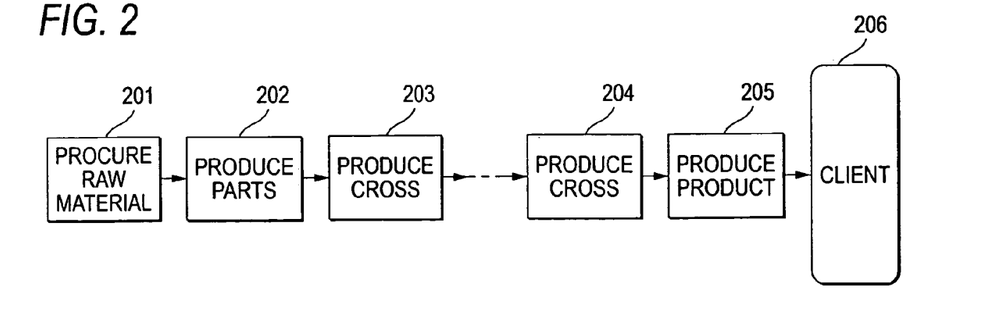
FIG. 2 is a diagram describing an item flow according to the embodiment of the invention.

As shown in FIG. 2, for a product to be described as an example in this embodiment, a supplier first procures a raw material (201) and produces parts from the raw material (202). Then, the supplier supplies the produced parts to a manufacturer in a downstream step. The manufacturer produces crosses from the parts supplied from the supplier (203) and produces a larger cross from the crosses and/or parts (204). Then, the manufacturer produces the product from these crosses (205) and ships the product. The shipped product is delivered to a client (206).

In this embodiment, based on a product shipping plan thereof, a calculation control portion determines calculation processing portion among multiple calculation processing portions based on production constraints of the product, crosses and parts and calculates a production plan. Generally, one company produces multiple kinds of product. The parts structure to be handled in an assembly type production step among those products generally has more stages and is complicated. Furthermore, the number of process type production steps may be higher than 100. Describing embodiments of all of the steps for real products is not realistic then. Therefore, in order to clearly describe details of the invention, this embodiment will describe simplified type of product, parts construction and number of steps.

The expression "step" herein may refer to a set of tasks to be performed in one facility and/or worker or may be a set of tasks to be performed in multiple facilities and/or multiple workers. Alternatively, a factory may be regarded as one step. In general, facilities and/or workers in the manufacture industry are often managed by an organization for some reasons such as works and costs. Therefore, the "step" may be handled in organizations.

Figure 1:
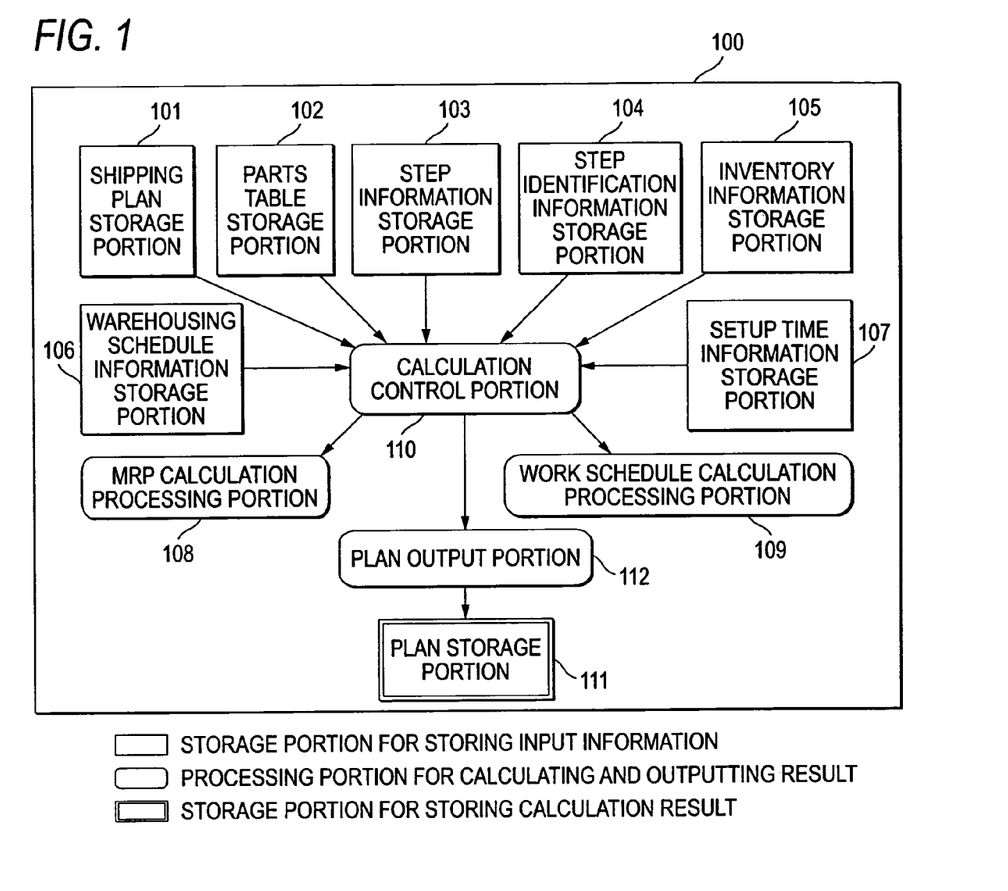
FIG. 1 is a diagram showing a construction of a production planning apparatus according to an embodiment of the invention.

First of all, a production planning apparatus 100 according to this embodiment will be described with reference to FIG. 1. The production planning apparatus 100 of this embodiment mainly includes a "storage portion for storing input information", a "processing portion for calculating and outputting a result" and a "storage portion for storing a calculation result".

The storage portion for storing input information among them has a shipping plan storage portion 101, a parts table storage portion 102, a step information storage portion 103 and a step identification information storage portion 104. The shipping plan storage portion 101 stores the requested shipping date and amount of each product, that is, stores shipping plan information. The parts table storage portion 102 stores a parts structure and production lead time for each product. The step information storage portion 103 stores steps for producing a product or part (collectively called item), order of the steps and required times. The step identification information storage portion 104 stores identifiers of steps. The production planning apparatus 100 may further have an inventory information storage portion 105, a warehousing schedule information storage portion 106 and a setup time information storage portion 107 as required. The inventory information storage portion 105 stores an inventory of an item. The warehousing information storage portion 106 stores an available time of each part when the part is procured to be available and the amount. The setup time information storage portion 107 stores a setup time required for producing an item in a step of producing the item. The storage portions 105, 106 and 107 may be eliminated if no information is available to store therein.

The processing portion for performing a calculation includes an MRP calculation processing portion 108, a work schedule calculation processing portion 109, a calculation control portion 110 and a plan output portion 112. The MRP calculation processing portion 108 calculates a date to start, date to complete and amount to complete of an item based on shipping plan information and by using a parts table, inventory information and warehousing schedule information thereof. The work schedule calculation processing portion 109 calculates a date and time to start, date and time to complete and amount to complete of an item based on shipping plan information thereof and by using step information and setup time information. The calculation control portion 110 activates the MRP calculation processing portion 108 or work schedule calculation processing portion 109 based on shipping plan information and by using step identification information. The plan output portion 112 outputs an amount of an item to produce or procure per day to a plan storage portion.

The storage portion for storing a calculation result corresponds to a plan storage portion 111 for storing a production plan including dates and amounts to produce a product, crosses and parts and a procurement plan including dates needing a raw material, which must be newly procured, and the amount.

The production planning apparatus 100 of this embodiment may be installed in a computer such as a personal computer and may store programs of the "storage portion for storing input information", "storage portion for storing a calculation result" and "processing portion for calculating and outputting a result" in a hard disk thereof. A CPU thereof performs processing described in the programs. More specifically, input information selected by the program is loaded from the "storage portion for storing input information" of the hard disk to a memory, and the CPU performs a computing selected by the program and temporarily stores the computing result in the memory. One selected by the program among computing results stored in the memory is output to the "storage portion for storing a calculation result" of the hard disk. The "storage portion for storing input information", "processing portion for calculating and outputting a result" and "storage portion for storing a calculation result" may be all installed in a standalone computer or may be distributed to machines connected over a network such as Ethernet and information may be exchanged via the network as required. For example, the storage portion relating to parts production and procurement may be provided in the machine managed by a supplier. The storage portion relating to cross production and procurement may be provided in the machine managed by a manufacturer. The planning portion, plan storage portion and plan output portion may be provided in the machine managed by an information department of a manufacturer.

Next, an operation of the production planning apparatus 100 of this embodiment will be described more specifically.

Figure 3:
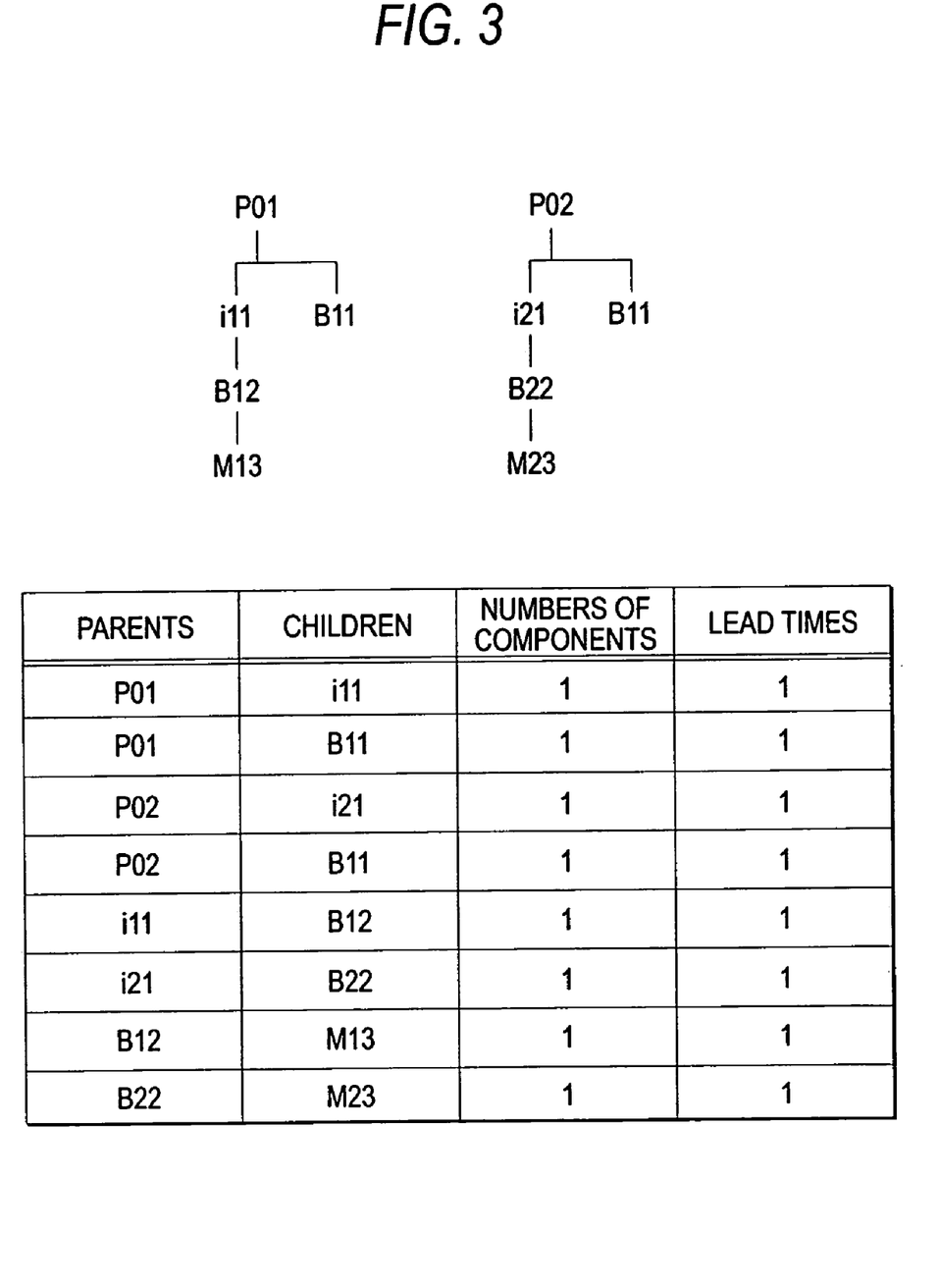
FIG. 3 is a parts structure diagram for explanation of the embodiment of the invention.

FIG. 3 shows parts structures of a product to be handled in this embodiment. As shown in FIG. 3, Product-To-Produce P01 includes Cross i11 and Part B11, and the lead time is one (1) day. The parts table storage portion 102 stores the data shown in FIG. 3. The names such as P01, i11 and B11 are codes given for convenience, and, if a product is a liquid crystal monitor, P01, i11, B11, B12 and M13 may be a liquid crystal monitor, a liquid crystal panel, a backlight, a TFT substrate and a glass substrate, respectively. In order to obtain the liquid crystal monitor, a TFT is formed on the glass substrate, whereby a TFT substrate can be obtained. The TFT substrate is injected with a liquid crystal agent and is provided with a driver, whereby a liquid crystal panel can be obtained. The liquid crystal monitor can be obtained by assembling the backlight into the liquid crystal panel.

Figure 4:
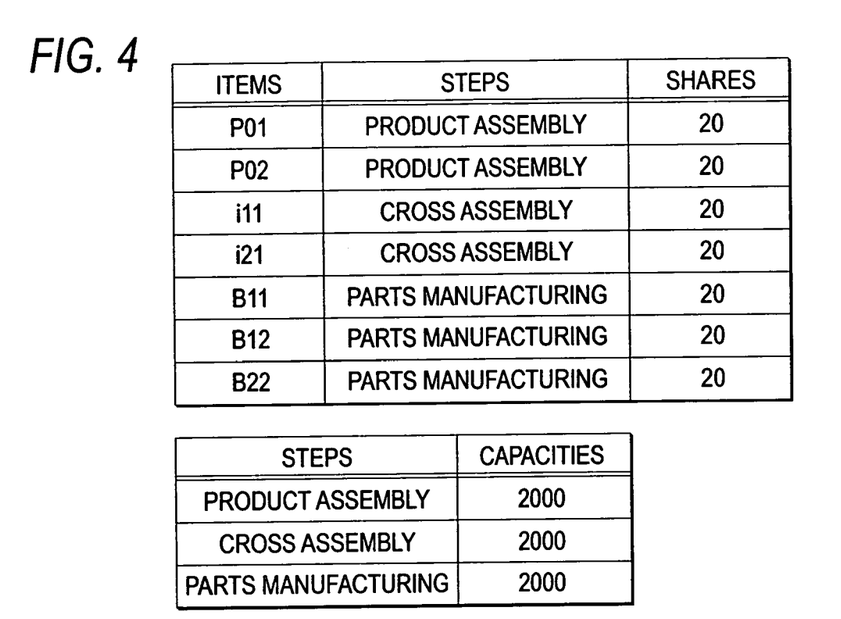
FIG. 4 is a diagram describing step information.

FIG. 4 shows steps required for a production and the shares and available capacities of the steps per day. For example, Item P01 is produced in the product assembly step, and the share of the product assembly step for producing P01 is 20 per unit. The product assembly step has a capacity of 2000 per day. The names, product assembly, cross assembly and parts manufacturing, are codes given for convenience. In the liquid crystal monitor example above, the product assembly refers to the step of producing the liquid crystal monitor. The cross assembly refers to the step of producing the liquid crystal panel from the TFT substrate. The parts manufacturing refers to the step of producing the TFT substrate. The step information storage portion 103 stores data shown in FIG. 4.

Figure 5:
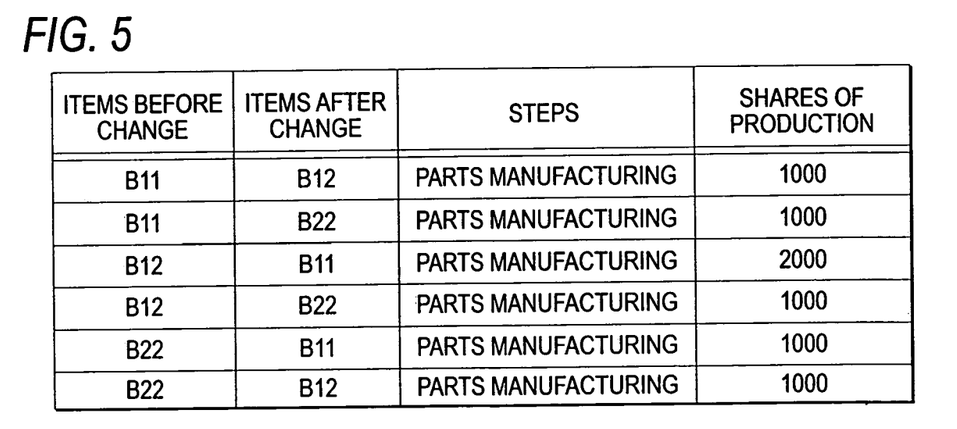
FIG. 5 is a diagram describing setup time information.

FIG. 5 shows shares of the steps required for item changes. For example, when B11 is changed to B12, the share of the parts manufacturing step is 1000. The setup time information storage portion 107 stores the data shown in FIG. 5.

Figure 6:
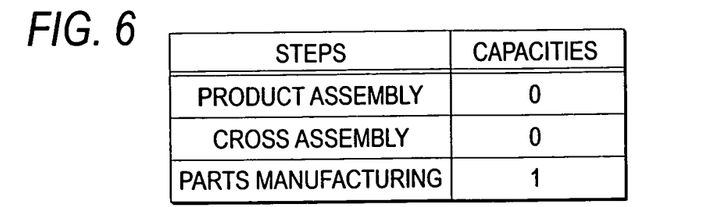
FIG. 6 is a diagram describing step identification information.

FIG. 6 shows step types. A step type is used to determine which calculation processing portion is to be used to calculate a production plan. In this example, if the step identification flag is "0", the production plan is calculated by the MRP calculation processing portion 108. If "1", the production plan is calculated by the work schedule calculation processing portion 109. The step identification information storage portion 104 stores the data shown in FIG. 6.

Figure 7:
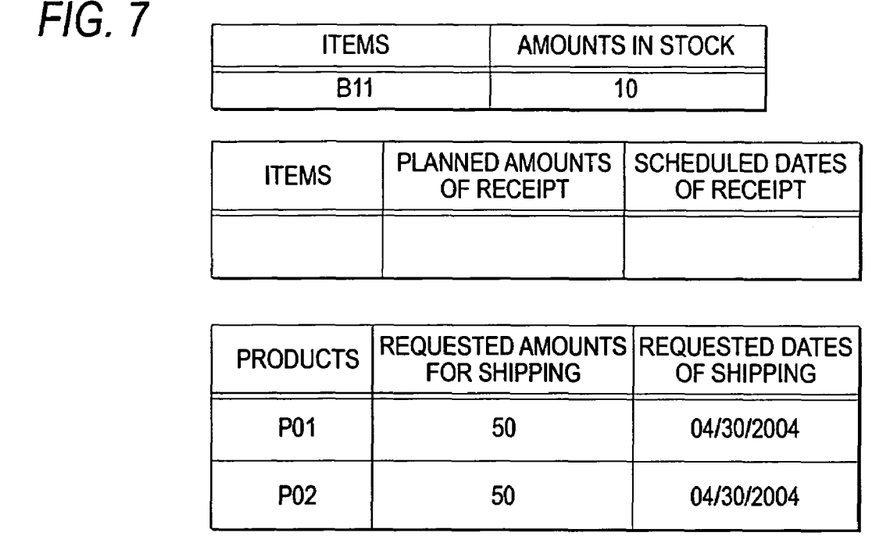
FIG. 7 is a diagram describing inventory information, warehousing schedule information and shipping planning information.

FIG. 7 shows information on inventories, warehousing schedules and shipping plans. Part B11 has an inventory of 10. The inventory information storage portion 105 stores data on inventories. The warehousing schedule information storage portion 106 stores data on warehousing schedules. The shipping plan storage portion 101 stores shipping plans. The shipping plan information includes a requested amount to ship and date to ship of each product as shown in FIG. 7. The calculation control portion 110, the MRP calculation processing portion 108 and work schedule calculation portions 109 devise production plans based on the shipping plans.

Figure 8:
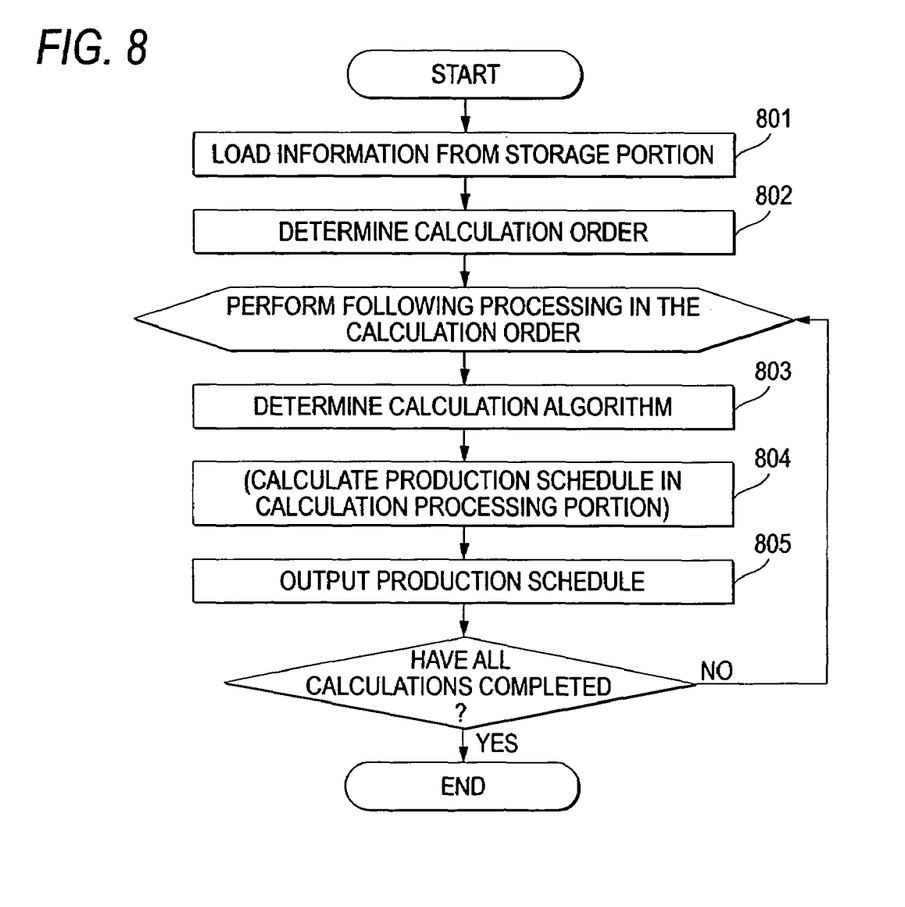
FIG. 8 is a diagram showing a flow of processing by a calculation control portion of the production planning apparatus according to the embodiment of the invention.

The calculation control portion 110 performs production plan devising processing by using the CPU and the memory in steps shown in FIG. 8. The processing in each of the steps shown in FIG. 8 will be described below.

<Step 801>

Input information pieces 101 to 107 required for calculations are loaded from the "storage portion for storing input information" onto the memory. If no data on a shipping plan is available, it is regarded as that no item is requested to produce, and the processing ends.

<Step 802>

An order of steps for manufacturing a product registered with the shipping plan is determined including that for the production of parts therefor based on the shipping plan, parts table and step information. For example, since P01 is produced in order of B12, i11, B11 and P01 on the parts table, the order of steps is parts manufacturing, cross assembly and product assembly. The order of steps for P02 is also parts manufacturing, cross assembly and product assembly. The order of calculations is reverse to the order of steps. In this example, the order of calculations is product assembly, cross assembly and parts manufacturing. Since a topological sort is often used as the algorithm for calculating the order in general, the algorithm may be installed in the calculation control portion to calculate the order, which allows more efficient calculation.

In subsequent steps 803 to 805, the processing is performed in steps in the calculation order determined in step 802. For the steps without top-down relationship in order as a result of the sort in step 802, the calculation control portion may activate steps 803 to 805 to perform parallel calculations by using the information. For the parallel calculations, the MRP calculation processing portion 108 and work schedule calculation processing portion 109 supporting the parallel calculations must be provided.

<Step 803>

Figure 9:
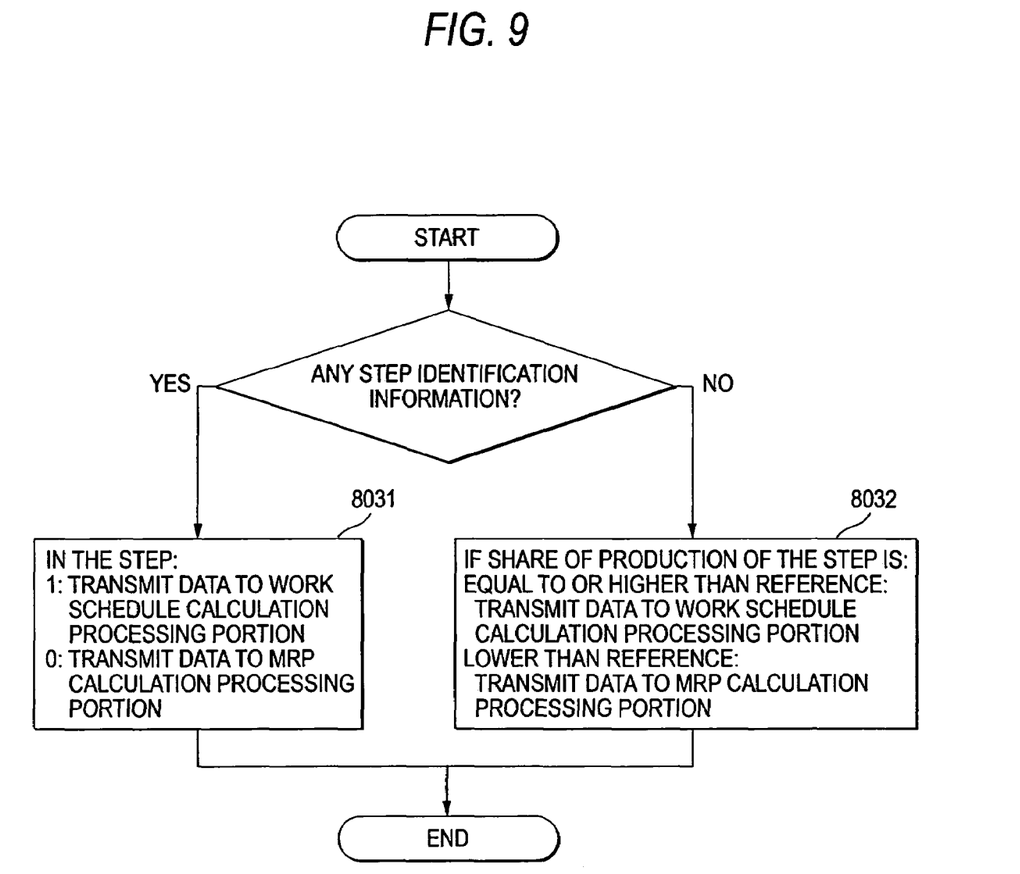
FIG. 9 is a diagram showing calculation algorithm determining processing by the calculation control portion of the production planning apparatus according to the embodiment of the invention.

An algorithm for devising a production plan for a target step is determined based on an identifier or reference value, which will be described later. FIG. 9 shows the determination flow. First of all, the memory is searched for step identification information storage portion 104. If the step identification flag for the target step is "1" in the step identification information storage portion 104 if any, the work schedule calculation algorithm is selected, while the MRP calculation algorithm is selected if "0" in step 8031. If the step identification information storage portion 104 is not available, the setup time information storage portion 107 for the target step is referred in step 8032. The setup time information storage portion 107 has a share depending on the work schedule as described with reference to FIG. 5. If the value is high, the share of the step largely depends on the work schedule. For example, when B11 and B12 are to be produced, and when B11 and B12 are produced in order, the setup share of 1000 shown in FIG. 5 is required in addition to the production share. On the other hand, when B11 and B12 are produced in order of B12 and B11, the setup share is 2000. Since the capacity of the step corresponding to the time of the setup share cannot be used for the production, the "work schedule calculation algorithm" for calculating the work schedule is preferably selected if the value is high. Thus, according to this embodiment, if the setup share is equal to or higher than a predefined reference, the work schedule calculation algorithm is selected. If the setup share is lower than the reference, the MRP calculation algorithm is selected. The reference is uniquely determined based on characteristics of the product and/or steps. However, a fixed threshold which is, for example, a half amount of the capacity of the step may be provided in the setup shares, and a setup share may be equal to or higher than the reference if at least one piece of data is equal to or higher than the threshold value in the target steps. The reference may be programmed as processing by the calculation control portion. Alternatively, another storage portion may be provided, and the reference may be loaded onto the memory therefrom. When a given setup share depends on the skill level of the worker, the setup share may be obtained based on the work performance (when and how many of which item was charged and was completed), and the setup share may be automatically input to the setup time information storage portion 107 of the production planning apparatus 100.

<Step 804>

A production plan is devised by the calculation processing portion. More specifically, the date to start, date to complete and amount to produce are determined based on the item, requested date of shipping or the date to start in the previous step. Many algorithms have been proposed for the MRP calculation and work schedule calculation. The description on the details of the algorithms will be omitted in this description on this embodiment.

<Step 805>

The production plan (including the item, steps, date to start, date to complete and amount to produce) calculated in step 804 is output to the plan storage portion 111.

Figure 10:
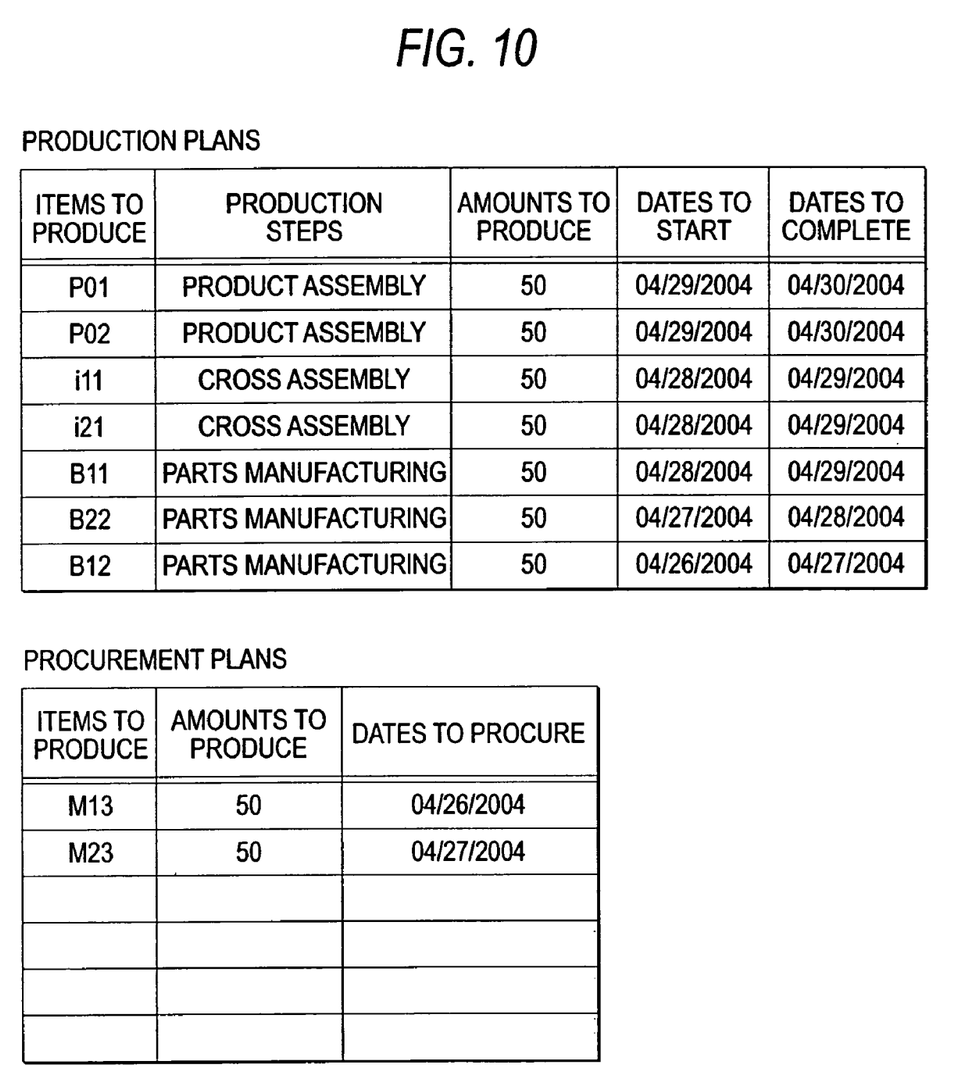
FIG. 10 is a diagram describing production plan and procurement plan information.

FIG. 10 shows the information to be output to the plan storage portion 111. The production plan and procurement plan stored in the plan storage portion 111 may be output as electronic data to paper, a display or another system so as to check the result.

When steps 803 to 805 are implemented with the data shown in FIGS. 3 to 7, the processing is performed in order of (1): product assembly, (2): cross assembly and (3): parts manufacturing as described below.

First of all, the product assembly will be described.

(1): Product Assembly includes:

<Step 803>

"MRP calculation algorithm" is determined as the algorithm for the product assembly based on the step identification flag, "0", in the step identification information.

<Step 804>

The MRP calculation processing portion 108 calculates the amount to produce, date to start and date to complete by the MRP calculation algorithm. P01 and P02 are items to produce in the product assembly. First of all, the date to complete for both P01 and P02 is Apr. 30, 2004 since the requested date of shipping in the shipping plan in the shipping plan storage portion 101 is set from the memory. The amount to produce is calculated by setting the requested amount to ship in the shipping plan storage portion 101 and the amounts to produce, 50, for P01 and P02 are set from the memory and subtracting an inventory and a warehousing schedule in the inventory information storage portion 105 and warehousing schedule storage portion 106 from 50. Since no inventory and warehousing schedule are available in this example, the amounts to produce are 50. Next, the date to start is calculated by subtracting a lead time in the parts table storage portion 102 from the date to complete. Searching information having Parent 01 results in 1 as the lead time of Child i11 and 1 as the lead time of Child B11. Therefore, the lead time of Parent P01 is 1, which is the highest value therebetween. The lead time for Parent P02 is calculated in the same manner, and the date to start for both Parents P01 and P02 is Apr. 29, 2004. The information on the date to start is stored in the memory.

<Step 805>

Following information stored in the memory is output to the plan storage portion 111.

Item: P01, Step: Product Assembly, Date to Start: Apr. 29, 2004, Date to complete: Apr. 30, 2004 and Amount to Produce: 50

Item: P02, Step: Product Assembly, Date to Start: Apr. 29, 2004, Date to complete: Apr. 30, 2004 and Amount to Produce: 50

Next, the cross assembly will be described.

(2): Cross Assembly includes:

<Step 803>

"MRP calculation algorithm" is determined as the algorithm for the cross assembly based on the step identification flag.

<Step 804>

The MRP calculation processing portion 108 calculates the amount to produce, date to start and date to complete by the MRP calculation algorithm. i11 and i21 are items to produce in the cross assembly. First of all, the date to complete for i11 is Apr. 29, 2004 since the date to start for Parent P01 stored in the plan storage portion 111 is set where Parent P01 is the parent of i11 on the parts table. The date to start for i21 is also Apr. 29, 2004. The amount to produce is calculated by multiplying the amount to produce, 50, for P01 and P02, which are the parents on the parts table in the parts table storage portion 102, by the number of components on the parts table in the parts table storage portion 102 and subtracting an inventory and a warehousing schedule in the inventory information storage portion 105 and warehousing schedule storage portion 106 therefrom. Since the number of component is 1 and no inventory and warehousing schedule are available in this example, the amounts to produce are 50. Next, the date to start is calculated by subtracting a lead time on the parts table from the date to complete. Thus, the date to start for both i11 and i21 is calculated as Apr. 28, 2004.

<Step 805>

Following information is output to the plan storage portion 111.

Item: i11, Step: Cross Assembly, Date to Start: Apr. 28, 2004, Date to complete: Apr. 29, 2004 and Amount to Produce: 50

Item: i21, Step: Cross Assembly, Date to Start: Apr. 28, 2004, Date to complete: Apr. 29, 2004 and Amount to Produce: 50

Next, the parts manufacturing will be described.

(3): Parts Manufacturing includes:

<Step 803>

"Work schedule calculation algorithm" is determined as the algorithm for the parts manufacturing based on the step identification flag.

<Step 804>

The work schedule calculation processing portion 109 calculates the amount to produce, date to start and date to complete by the work schedule calculation algorithm. B11, B12 and B22 are items to produce in the parts manufacturing. First of all, the date to complete (which will be called requested date to complete) for them are calculated. The date to complete for B11 is Apr. 29, 2004 since the date to start for Parent P01 and date to start for Parent P02 stored in the plan storage portion 111 are set where P01 and P02 are the parents on the parts table. The date to complete for B12 and B22 are Apr. 28, 2004 since the dates to start for i11 and i21 stored in the plan storage portion 111 are also referred and set where i11 and i21 are the parents on the parts table.

The amount to produce is calculated by multiplying the amount to produce, 50, for the parents on the parts table in the parts table storage portion 102 by the number of components on the parts table in the parts table storage portion 102 and subtracting an inventory and a warehousing schedule in the inventory information storage portion 105 and warehousing schedule storage portion 106 therefrom. Since the number of component is 1 and no inventory and warehousing schedule are available for B12 and B22 in this example, the amounts to produce are 50. Since the number of component is 1 from P01 and P02 and the inventory is 10, the amount to produce is 50×1+50×1−10=90.

Next, the share time by each item is obtained from the step information in the step information storage portion 103. B11 has a share of 20 per unit, which is multiplied by the amount to produce 90, resulting in 1800. The same calculation is performed for B12 and B22, resulting in 1000 for B12 and 1000 for B22.

Next, the work schedule having the date to complete before the requested date to complete and having a date to start as late as possible is searched with reference to the setup share in the setup time information storage portion 107. First of all, possible work schedules are listed. In this example, six of "B11, B12 and B22", "B11, B22 and B12", "B12, B11 and B22", "B12, B22 and B11", "B11, B12 and B22" and "B11, B22 and B12" are possible. Various algorithms have been proposed for the adoption of one of them. For example, the algorithm for assigning the capacity of the step in order of decreasing time to the requested dates to complete and in order of increasing setup time is used to solve the example.

First of all, 1800 for B11 is subtracted from a capacity of 2000 on Apr. 29, 2004. Thus, both of the date to start and date to complete for B11 are calculated as Apr. 29, 2004. Therefore, the remaining capacity is 200. The remaining capacity is stored in the memory.

Since B12 and B22 serving as the next candidates to assign have the same requested date to complete of Apr. 28, 2004, the setup time for changing to B11 is compared in the setup shares in the setup time storage portion 107. Since the setup time from B12 to B11 is 2000 and the setup time from B22 to B11 is 1000, B22 is handled as a candidate to assign.

First of all, since subtracting the setup time, 1000, from the remaining capacity, 200, on Apr. 29, 2004 results in −800, subtracting 800 from the capacity, 2000, on Apr. 28, 2004 results in a capacity of 1200 on Apr. 28, 2004. Subtracting the share time, 1000, of B22 therefrom results in a consumption of 1000 of 1200 on Apr. 28, 2004. Thus, both of the date to start and date to complete for B22 are calculated as Apr. 28, 2004.

Also for B12 serving as the next candidate to assign, subtracting the setup time, 1000, for changing from B12 to B22 from the capacity with reference to the setup share in the setup time information storage portion 107 results in a remaining capacity of 1200 on Apr. 27, 2004. Subtracting the share time, 1000, of B12 therefrom results in a consumption of 1000 of the remaining capacity, 1200, on Apr. 27, 2004. Therefore, both of the date to start and date to complete for B21 are Apr. 27, 2004.

<Step 805>

Following information is output to the plan storage portion 111.

Item: B11, Step: Parts Manufacturing, Date to Start: Apr. 29, 2004, Date to complete: Apr. 29, 2004 and Amount to Produce: 90

Item: B22, Step: Parts Manufacturing, Date to Start: Apr. 28, 2004, Date to complete: Apr. 28, 2004 and Amount to Produce: 50

Item: B12, Step: Parts Manufacturing, Date to Start: Apr. 27, 2004, Date to complete: Apr. 27, 2004 and Amount to Produce: 50

These calculations fix the production plan of the step subject to the calculation. When information on materials are listed on the parts table like M13 and M23 in this example, the calculation control portion 110 can output the procurement plan. Then, the dates to start for B12 and B22, which are parents of M13 and M23, may be set as the dates to procure with reference to the parts table in the parts table storage portion 102. FIG. 10 shows the production plan and procurement plan stored in the plan storage portion in this example.

As described above, according to this embodiment, scheduling calculation is applied to steps having an order constraint in the product production plan having a manufacturing step with the throughput depending on the order of start. Thus, quick Available to Promise based on the accurate production plan can be achieved, which was not possible with conventional MRP only. Though the simplified kind of product and parts structure are adopted in this example for clear illustration of details of the invention, the invention is also applicable to a production form having multiple kinds of product and a complicated parts structure in many stages.

The invention claimed is:

1. A production planning apparatus for devising a production plan based on at least shipping plan information and parts table of a product, the production planning apparatus comprising:

a calculation processing portion;

a storage portion; and input/output means, wherein the production planning apparatus divides a production step of the product into multiple production steps based on a constraint to be considered when a production plan therefor is devised, defines identifiers for the multiple production steps and prestores the defined identifiers in the storage portion as step identification information, and stores step information having at least correspondences between the production steps and items in the storage portion;

wherein the production planning apparatus stores, in the storage portion, setup time information indicating the setup share for each work schedule in each production step;

the calculation processing portion has:

a first calculation processing portion for calculating a date to start, date to complete and amount to complete of an item by using shipping plan information, a parts table, inventory information and warehousing schedule information, based on a first calculation algorithm;

a second calculation processing portion for calculating a date and time to start, date and time to complete and amount to complete of an item by using shipping plan information, step information and setup time information, based on a second calculation algorithm; and a calculation control portion for controlling the first and second calculation processing portions; and the calculation control portion identifies and determines production steps and order of calculations, which are involved in the production of the product, based on the shipping plan information, parts table and step information and activates and controls one of the first and second calculation processing portion based on the step identification information or the value of the setup time information if the step identification information is not available, to calculate a production plan for each production step based on the order of calculations.

2. The production planning apparatus according to claim 1, wherein the first and second calculation processing portion and the calculation control portion support parallel calculations; and the calculation control portion controls the first and second calculation processing portion to operate in parallel.

3. A production planning method for devising a production plan based on at least shipping plan information and a parts table of a product, the method comprising:

storing, in a storage portion, programs including a first production plan calculation algorithm suitable for calculating a date to start, date to complete and amount to complete of an item by using shipping plan information, a parts table, inventory information and warehousing schedule information and a second production plan calculation algorithm suitable for calculating a date and time to start, date and time to complete and amount to complete of an item by using shipping plan information, step information and setup time information;

storing, in the storage portion, setup time information indicating a setup share of each work schedule in each production step;

dividing the product production step into multiple production steps in advance based on constraints to be considered when the production plan is devised, defining identifiers for the multiple production steps, and storing the identifiers in the storage portion as step identification information in advance;

storing, in the storage portion, step information having at least correspondences between the production steps and the items; and identifying and determining production steps and an order of calculations involved in the production of the product based on the shipping plan information, the parts table and the step information, determines which of the first and second production plan calculation algorithms is to be executed based on the order of calculations and based on the step identification information for production steps or the value of the setup time information if the step identification information is not available, and calculating the production plan by using the program including the determined algorithm.

4. The production planning method according to claim 3, in which calculation processing portions supporting parallel calculations are provided, the method further comprising:

performing calculations by executing the programs including the first and second calculation algorithms in parallel.

* * * * *